(12) United States Patent
Kawabuchi et al.

(10) Patent No.: US 8,074,164 B2
(45) Date of Patent: Dec. 6, 2011

(54) DOCUMENT MANAGEMENT DEVICE AND DOCUMENT MANAGEMENT METHOD

(75) Inventors: Yoichi Kawabuchi, Itami (JP); Yoshikazu Ikenoue, Itami (JP); Masakazu Murakami, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1027 days.

(21) Appl. No.: 11/337,669

(22) Filed: Jan. 24, 2006

(65) Prior Publication Data

US 2007/0047014 A1 Mar. 1, 2007

(30) Foreign Application Priority Data

Aug. 25, 2005 (JP) ................................. 2005-243675

(51) Int. Cl.
*G06F 17/21* (2006.01)
(52) U.S. Cl. ...................................... 715/229
(58) Field of Classification Search .................. 715/229, 715/230
See application file for complete search history.

(56) References Cited

U.S. PATENT DOCUMENTS

| | | | |
|---|---|---|---|
| 5,546,565 A | 8/1996 | Suzuki | |
| 5,767,847 A * | 6/1998 | Mori et al. | 715/733 |
| 5,819,040 A * | 10/1998 | Ogaki et al. | 709/217 |
| 5,848,248 A * | 12/1998 | Kawasaki et al. | 709/238 |
| 5,940,829 A * | 8/1999 | Tsuiki et al. | 707/10 |
| 5,999,968 A * | 12/1999 | Tsuda | 709/213 |
| 6,144,955 A * | 11/2000 | Tsuiki et al. | 707/1 |
| 6,151,583 A * | 11/2000 | Ohmura et al. | 705/8 |
| 6,279,031 B1 * | 8/2001 | Kawasaki et al. | 709/207 |
| 6,298,154 B1 | 10/2001 | Cok | |
| 6,356,923 B1 * | 3/2002 | Yano et al. | 717/127 |
| 6,502,087 B1 * | 12/2002 | Tsuiki et al. | 707/1 |
| 6,526,425 B2 * | 2/2003 | Mori et al. | 715/229 |
| 6,622,162 B2 * | 9/2003 | Kawasaki et al. | 709/207 |
| 6,643,401 B1 | 11/2003 | Kashioka et al. | |

(Continued)

FOREIGN PATENT DOCUMENTS

JP 8-006876 1/1996

(Continued)

OTHER PUBLICATIONS

Wu, Efficient Authentication of Electronic Document Workflow, Sprinter-Verlag Berlin, Lecture Notes in Computer Science vol. 3822, 2005, p. 101-112.*

(Continued)

*Primary Examiner* — Laurie Ries
*Assistant Examiner* — Frank D Mills
(74) *Attorney, Agent, or Firm* — Buchanan Ingersoll & Rooney PC

(57) ABSTRACT

The document management device is for managing a document circulated to a reader in accordance with a circulation tree and additional information added to the document by the reader. The circulation tree indicates the circulation order of plural readers. The device includes: document circulation unit for enabling the $n^{th}$ (n is an integer not less than 2) reader to read the $n-1^{th}$ generation document data cumulatively including the $1^{st}$ additional information to the $n-1^{th}$ additional information added, by the first reader to the $n-1^{th}$ reader respectively, to the $0^{th}$ generation document data readable by the first reader of the circulation tree; recognition unit for recognizing the $n^{th}$ additional information added by the $n^{th}$ reader as electronic data; and additional information management unit for managing the $n^{th}$ additional information by associating it with the $0^{th}$ generation document data.

3 Claims, 9 Drawing Sheets

U.S. PATENT DOCUMENTS

| | | | |
|---|---|---|---|
| 6,651,033 B2* | 11/2003 | Nemoto et al. | 702/182 |
| 6,703,633 B2 | 3/2004 | Tullis | |
| 7,035,910 B1* | 4/2006 | Dutta et al. | 715/200 |
| 2001/0013044 A1* | 8/2001 | Mori et al. | 707/511 |
| 2001/0047371 A1* | 11/2001 | Kawasaki et al. | 707/511 |
| 2002/0059222 A1* | 5/2002 | Sasaki et al. | 707/5 |
| 2002/0073161 A1* | 6/2002 | Yamazaki et al. | 709/206 |
| 2002/0078088 A1* | 6/2002 | Kuruoglu et al. | 707/512 |
| 2002/0107886 A1* | 8/2002 | Gentner et al. | 707/511 |
| 2002/0133315 A1* | 9/2002 | Nemoto et al. | 702/187 |
| 2002/0133316 A1* | 9/2002 | Nemoto et al. | 702/188 |
| 2003/0051213 A1* | 3/2003 | Mitsui | 715/511 |
| 2003/0115547 A1* | 6/2003 | Ohwada et al. | 715/511 |
| 2003/0214528 A1* | 11/2003 | Pierce et al. | 345/723 |
| 2004/0064356 A1* | 4/2004 | Saito et al. | 705/9 |
| 2004/0139391 A1* | 7/2004 | Stumbo et al. | 715/512 |
| 2004/0205653 A1* | 10/2004 | Hadfield et al. | 715/530 |
| 2004/0264811 A1* | 12/2004 | Yano et al. | 382/306 |

FOREIGN PATENT DOCUMENTS

| | | |
|---|---|---|
| JP | 2002-074321 | 3/2002 |
| JP | 2004-080601 | 3/2004 |
| JP | 2004-328451 | 11/2004 |
| JP | 2004-341914 | 12/2004 |
| JP | 2005-050018 | 2/2005 |

OTHER PUBLICATIONS

Official Action issued by the Japanese Patent Office in priority Japanese Patent Application No. 2005-243675; Sep. 18, 2007; and English-language translation thereof.

* cited by examiner

DOCUMENT MANAGEMENT DEVICE AND DOCUMENT MANAGEMENT METHOD

This application claims the priority of Japanese Patent Application No. 2005-243675 filed in Japan on Aug. 25, 2005, the contents of which are hereby incorporated by reference.

BACKGROUND OF THE INVENTION

1. Field of the Invention

The present invention relates to a document management device and a document management method for managing documents circulated to readers in turn via network and additional information added to the documents by the readers.

2. Description of the Related Art

There are proposed various circulation systems for circulating document data automatically via network and electronic approval systems. Further, in a work flow of document deliberation, there is a usage example in which a person requesting deliberation circulates a deliberation document to readers, and each of them writes comments in the original document and the comments are gathered by a handwriting recognition system. As a technique for recognizing comments written in the original document as described above, there is one in which image data of the original electronic file is processed to be expanded and is aligned with a retouched printed matter, and difference information is extracted by exclusive OR, and the original document data and the difference information are saved, as shown in Japanese Patent Laid-open Publication No. 2004-341914. Further, there is a technique in which code information is read out from a printed matter so as to read out original data, and a handwritten memo which is a difference between the original data and the printed matter is extracted, and output can be performed by selecting the memo only, the original only or both, as shown in Japanese Patent Laid-open Publication No. 2004-80601. Further, there is a technique in which handwritten data and print data are synthesized and displayed, and the handwritten data is edited on the display screen, and the print data and the handwritten data synthesized are stored while being associated to each other, as shown in Japanese Patent Laid-open Publication No. 2004-328451. Further, there is a technique in which a file name is written by hand in a file name field of a manuscript and when scanning is performed, an electronic file is automatically created with the file name, as shown in Japanese Patent Laid-open Publication No. 2002-74321.

However, the conventional techniques described above are separate systems such as a circulation system and a handwriting recognition system, so it is required to configure a system by installing, into a PC, a separate dedicated application for each. Therefore, preparation for using them actually is troublesome. Further, since they are separate independent systems, initial registration and progress management of documents must be performed separately, which causes a number of work units. In addition, a user in charge thereof must handle corresponding to each system and application, which causes a problem of bad operability.

Further, in the usage example of the conventional technique, when a document in which comments are written by a plurality of readers is circulated, comments from the readers to which the document has been circulated cannot be referred to, so the same comments may be repeated. Further, if comments written in each circulation are managed by each deliberation document circulated, management becomes complicated and uniform management cannot be performed.

SUMMARY OF THE INVENTION

An object of the present invention is to provide a document management device and a document management method capable of easily managing an original document and comments added by readers, and enabling readers to refer to comments which have been added at the time of circulation.

A document management device according to the present invention is a device for managing a document circulated in accordance with a circulation tree and additional information added to the document by the readers. The circulation tree indicates the circulation order of a plurality of readers. The device includes: document circulation unit for enabling the $n^{th}$ (n is an integer not less than 2) reader of the circulation tree to read the $n-1^{th}$ generation document data which cumulatively includes $1^{st}$ to $n-1^{th}$ pieces of additional information added, by the first reader to the $n-1^{th}$ reader of the circulation tree respectively, to the $0^{th}$ generation document data readable by the first reader; recognition unit for recognizing the $n^{th}$ additional information added by the $n^{th}$ reader as electronic data; and additional information management unit for managing the $n^{th}$ additional information recognized, by associating it with the $0^{th}$ generation document data.

The recognition unit may recognize the $n^{th}$ additional information based on a difference between the $n^{th}$ generation document data including the $n^{th}$ additional information added to the $n-1^{th}$ generation document data by the $n^{th}$ reader and the $n-1^{th}$ generation document data. Further, the recognition unit may recognize the $n^{th}$ additional information as document data when it is added as document data, and recognize it as image data when it is added as image data.

The document management device may further comprise record unit for recording the $0^{th}$ generation document data, $1^{st}$ generation document data including $1^{st}$ additional information added by the first reader to the $0^{th}$ generation document data, and $2^{nd}$ generation to $n^{th}$ generation document data.

Further, the document management device may further comprise circulation information management unit for setting the circulation tree indicating the circulation order of the plurality of readers.

A document management method according to the present invention is a method for managing a document circulated according to a circulation tree and additional information added to the document by the readers. The circulation tree indicates the circulation order of a plurality of readers. The method includes: enabling an $n^{th}$ (n is an integer not less than 2) reader of the circulation tree to read $n-1^{th}$ generation document data which cumulatively includes $1^{st}$ to $n-1^{th}$ pieces of additional information added, by the first reader to the $n-1^{th}$ reader of the circulation tree respectively, to the $0^{th}$ generation document data readable by the first reader; recognizing $n^{th}$ additional information added by the $n^{th}$ reader as electronic data; and managing the $n^{th}$ additional information recognized, by associating it with the $0^{th}$ generation document data.

In the step of recognizing, the additional information may be recognized based on a difference between document data including the additional information added by the reader and the document data circulated to the reader. Further, in the step of recognizing, the $n^{th}$ additional information may be recognized as document data when it is added as document data, and recognized as image data when it is added as image data.

The document management method may further comprise a step of recording the $0^{th}$ generation document data, $1^{st}$ generation document data including $1^{st}$ additional information added to the $0^{th}$ generation document data by the first reader, and the $2^{nd}$ generation to $n^{th}$ generation document data.

Further, the document management method may further comprise a step of setting the circulation tree indicating the circulation order of the plurality of readers.

The present invention may be configured as a document management program for prompting a computer to execute the document management method. Further, the document management program may be stored on a computer readable recording medium.

According to the document management device and the document management method of the present invention, additional information cumulatively added to distributed child copies or grandchild copies can be managed collectively in association with the $0^{th}$ generation document data, whereby uniform management is possible. Further, additional information added by each reader can be read at the time of circulation.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE PREFERRED EMBODIMENT

Figure 1:
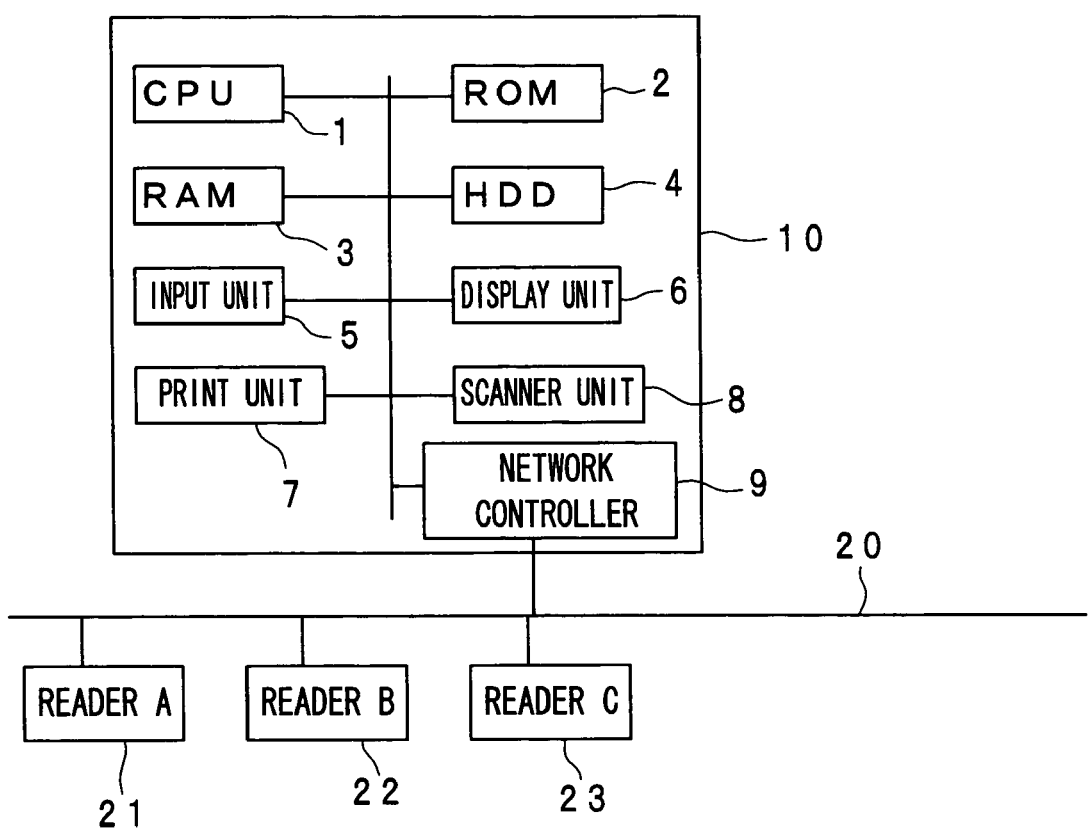
FIG. 1 is a block diagram showing the physical configuration of a document management device according to an embodiment 1 of the present invention.

A document management device and a document management method according to embodiments of the present invention will be explained by using accompanying drawings. Note that substantially same members in the drawings are denoted by the same reference numerals.

Embodiment 1

FIG. 1 is a block diagram showing the physical configuration of a document management device according to an embodiment 1 of the present invention. The document management device 10 is connected with respective terminals of a reader A 21, a reader B 22 and a reader C 23 over a network 20. Further, the document management device 10 includes a CPU 1, a ROM 2, a RAM 3, an HDD 4, an input unit 5, a display unit 6, a print unit 7, a scanner unit 8 and a network controller unit 9.

Figure 2:
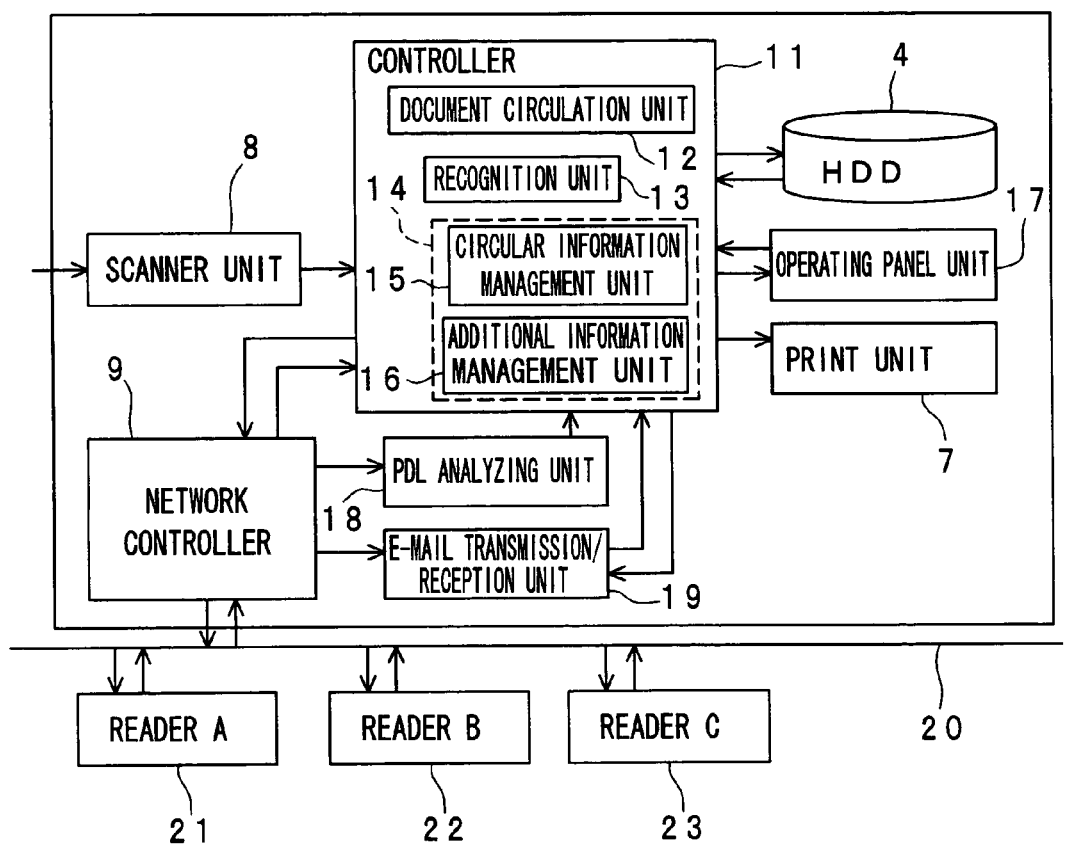
FIG. 2 is a block diagram showing the functional configuration of a document management device according to the embodiment 1 of the present invention.

FIG. 2 is a block diagram showing the functional configuration of the document management device 10. From a functional viewpoint, the document management device 10 includes the HDD 4, the print unit 7, the scanner unit 8, the network controller unit 9, a controller 11, an operating panel 17, a PDL analyzing unit 18, and an E-mail transmission/reception unit 19. Further, the controller 11 includes a document circulation unit 12, a recognition unit 13, a circular information management unit 15 and an additional information management unit 16. Note that the circular information management unit 15 and the additional information management unit 16 constitute an information management unit 14.

Next, each constitutional member of the document management device 10 will be explained.

In the print unit 7, document data is printed on a sheet. The scanner part 8 reads out a sheet document, and obtains image data as electronic data. Further, the network controller unit 9 transmits/receives packet data via network such as a LAN. The PDL (printer description language) analyzing unit 18 analyzes print data and converts it into image data. The E-mail transmission/reception unit 19 converts a document with comments after deliberation, transmitted from terminals 21, 22 and 23 of respective readers by E-mail, into image data. The operating panel 17 is one formed by combining the input unit 5 and the display unit 6 of FIG. 1, which displays a login screen and a box screen and receives key inputs and the like for work setting. The controller 11 manages circular documents and additional information added by the readers, and performs work control for circulation and the like. Further, the document circulation unit 12 of the controller 11 enables the $n^{th}$ (n is an integer not less than 2) reader to read the $n-1^{th}$ generation document data which includes the $1^{st}$ $n-1^{th}$ pieces of additional information added to the $0^{th}$ generation document data by the first reader to the $n-1^{th}$ reader of a circulation tree. The recognition unit 13 recognizes the $n^{th}$ additional information added by the $n^{th}$ reader as electronic data. The circular information management unit 15 sets a circulation tree indicating the circulation order of a plurality of readers. Further, the additional information management unit 16 manages the $n^{th}$ additional information recognized, in association with document data of a generation set beforehand, corresponding to a group to which the reader belongs.

Figure 3:
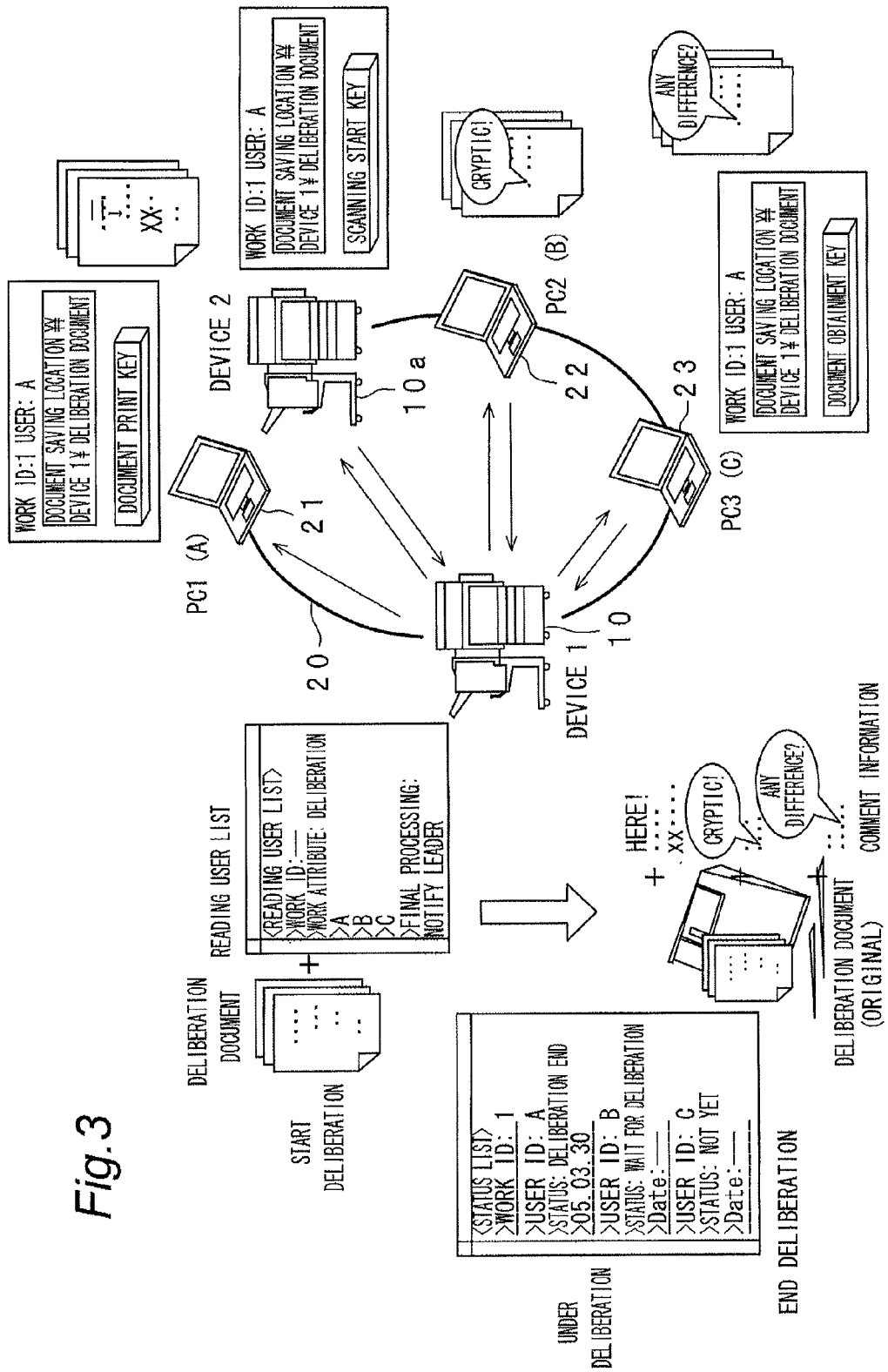
FIG. 3 is a schematic diagram showing an exemplary system including the document management device according to the embodiment 1 of the present invention.

FIG. 3 is a schematic diagram showing the configuration of a document management system including the document management device 10, user terminals 21, 22 and 23 of respective readers (A, B and C) connected over the network 20, and another document management device 10a. A circular document can be read by each reader from the document management device 10 in the circulation order which has been set (a reading user list in FIG. 3). Each reader reads the circular document by printing it on a sheet or as an electronic document. Further, after adding additional information on the circular document (e.g., comments such as "Cryptic!" or "Any difference?"), the reader transmits the document including the additional information to the document management device 10. In FIG. 3, a reader A prints the circular document on a sheet, and adds additional information by handwriting. Then, the sheet document including the additional information is converted into image data by a scanning function of the document management device 10a, and transmitted to the document management device 10. The document management device 10 extracts the additional information based on the difference between the transmitted document including the additional information and the previous circular document circulated to be readable by the reader, and manages the additional information in association with the original document. Then, the document management device 10 enables the circular document to be read by the next reader, extracts the additional information in the same procedure, and manages it in association with the original document. Note that in FIG. 3, "deliberation" is used instead of "circulation", and a "circular document" is indicated as a "deliberation document".

Figure 4:
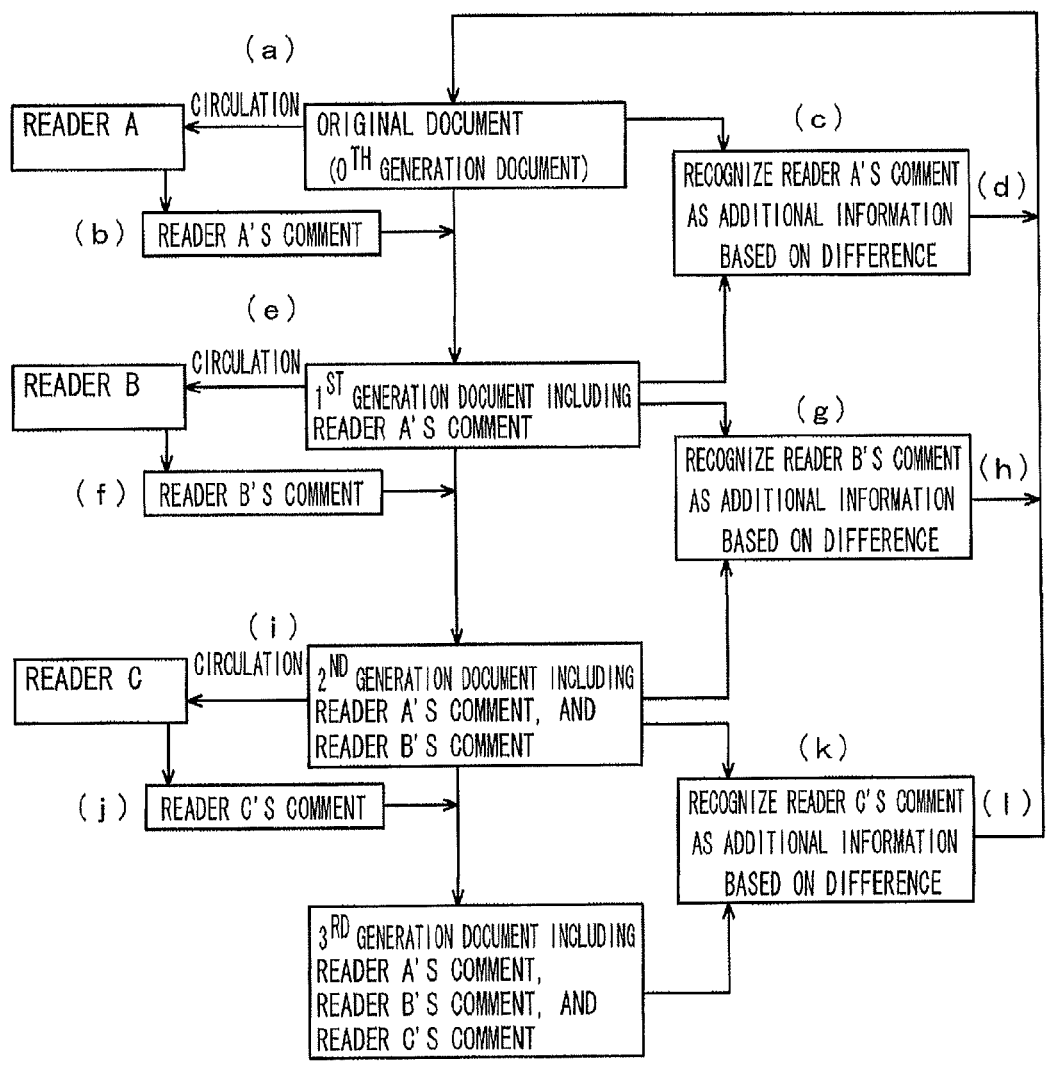
FIG. 4 is a schematic diagram showing an example of generation management of circular documents and additional information in a document management method according to the embodiment 1 of the present invention.

FIG. 4 is a schematic diagram showing circular documents circulated to the respective readers and extraction of additional information in the document management system in FIG. 3. By using FIG. 4, explanation will be given for the relationship between circular documents and additional information in a case of circulation from the reader A via the reader B to the final reader C.

(a) First, the $0^{th}$ generation document, which is the original-document, is circulated to the reader A.

(b) The reader A adds comments to the $0^{th}$ generation document. This document in which the comments from the reader A are added to the $0^{th}$ generation document is referred to as $1^{st}$ generation document.

(c) The comments from the reader A are extracted as additional information based on the difference between the $1^{st}$ generation document and the $0^{th}$ generation document.

(d) The additional information from the reader A is managed in association with the $0^{th}$ generation document which is the original document.

(e) Next, the $1^{st}$ generation document is circulated to the reader B.

(f) The reader B adds comments to the $1^{st}$ generation document. The document in which the comments from the reader B are added to the $1^{st}$ generation document is referred to as $2^{nd}$ generation document.

(g) The comments from the reader B are extracted as additional information based on the difference between the $2^{nd}$ generation document and the $1^{st}$ generation document.

(h) The additional information from the reader B is managed in association with the $0^{th}$ generation document.

(i) Next, the $2^{nd}$ generation document is circulated to the reader C.

(j) The reader C adds comments to the $2^{nd}$ generation document. The document in which the comments from the reader C are added to the $2^{nd}$ generation document is referred to as $3^{rd}$ generation document.

(k) The comments from the reader C are extracted as additional information based on the difference between the $3^{rd}$ generation document and the $2^{nd}$ generation document.

(l) The additional information from the reader C is managed in association with the $0^{th}$ generation document.

In this way, the document in which comments from the reader A to the reader C are added cumulatively is circulated to the next reader. Further, the comments added by each reader is extracted based on the difference between the documents before and after circulation, and is managed in association with the original document.

In the document management system, a circular document made to be readable by the $n^{th}$ reader is the $n-1^{th}$ generation document data in which additional information, from readers up to those who read right before, is added cumulatively to the $0^{th}$ generation document data (original document) circulated first, as shown in FIG. 4. As described above, in a case where connects from a plurality of readers are added to the original document sequentially, it may cause misrecognition if the comments are to be extracted after the circulation has been completed. In the document management device 10, however, additional information added in each circulation to each reader is extracted based on the difference between the documents before and after each circulation, so misrecognition due to overlap can be prevented. Further, additional information such as comments from each reader can be managed collectively by associating it with the original document.

Figure 5:
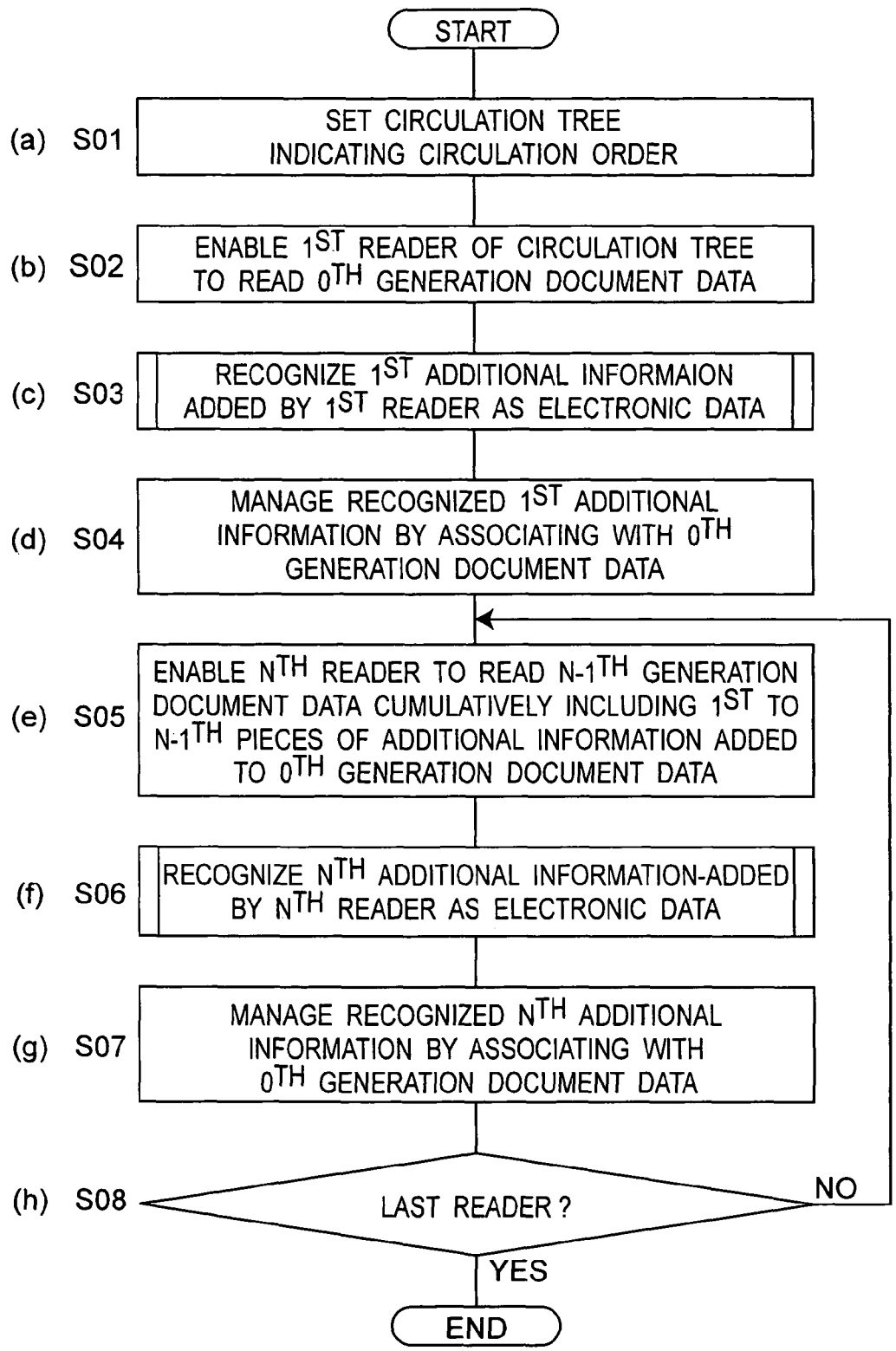
FIG. 5 is a flowchart showing the document management method according to the embodiment 1 of the present invention.

FIG. 5 is a flowchart showing a document management method according to the embodiment 1 of the present invention.

(a) First, a circulation tree indicating the circulation order of a plurality of readers is set (S01).

(b) The $0^{th}$ generation document data is made to be readable by the first reader in the circulation tree (S02). A method of enabling reading in this case is not limited specifically. For example, the $0^{th}$ generation document data may be transmitted to the first reader. Alternatively, a storing location of the $0^{th}$ generation document data stored on the HDD may be notified to the first reader, and reading by the first reader may be authorized. The reader may print the $0^{th}$ generation document data on a sheet or display it as an electronic document.

(c) The $1^{st}$ additional information added by the first reader is recognized as electronic data (S03). This recognizing step S03 will be described later in detail together with step S06.

(d) The $1^{st}$ additional information recognized is managed in association with the $0^{th}$ generation document data (S04).

(e) To the $n^{th}$ reader, the $n-1^{th}$ generation document data which cumulatively includes the $1^{st}$ to the $n-1^{th}$ pieces of additional information in the $0^{th}$ generation document data is made to be readable by the $n^{th}$ reader (S05). For example, for the second reader, the $1^{st}$ generation document data in which the $1^{st}$ piece of additional information from the first reader is added to the $0^{th}$ generation document data is made to be readable. Further, for the third reader, the $2^{nd}$ generation document data in which the $1^{st}$ piece of additional information from the first reader and the $2^{nd}$ piece of additional information from the second reader are added cumulatively to the $0^{th}$ generation document data is made to be readable.

(f) The $n^{th}$ additional information added by the $n^{th}$ reader is recognized as electronic data (S06). This recognizing step S06 will be described later in detail together with step S03.

(g) The $n^{th}$ additional information recognized is managed in association with the $0^{th}$ generation document data (S07).

(h) It is determined whether he/she is the last reader (S08). If he/she is the last reader, the processing ends. On the other hand, if he/she is not the last reader, the processing moves to step S05, and the $n^{th}$ generation document is made to be readable by the next $n+1^{th}$ reader.

In this way, the circular documents and the additional information from the readers can be managed in concentration.

Figure 6:
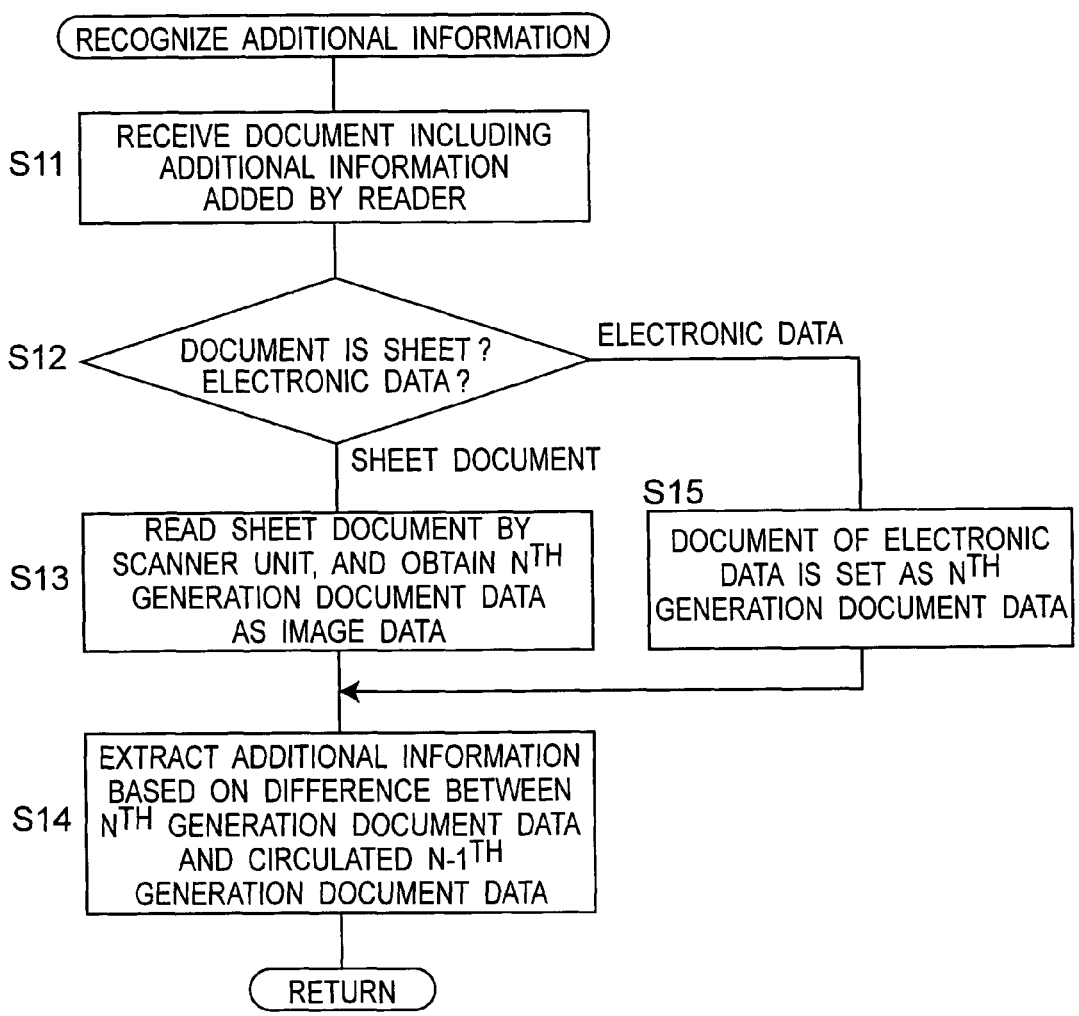
FIG. 6 is a flowchart showing steps S03 and S06 of FIG. 5 in detail.

FIG. 6 is a flowchart showing recognizing steps of the above-mentioned steps S03 and S06.

(a) First, a document including additional information added by the reader is received (S11).

(b) The document is determined whether it is a sheet document or electronic data (S12).

(c) If the document is a sheet document, the sheet document is read by the scanner unit, and the $n^{th}$ generation document data is obtained as image data (S13). On the other hand, if the document is electronic data, the document of electronic data is set as the $n^{th}$ generation document data (S15).

(d) Additional information is extracted based on the difference between the $n^{th}$ generation document data and the $n-1^{th}$ generation document data (S14). In this case, the difference can be obtained as image data, so this image data can be set as additional information.

In this way, additional information can be recognized as electronic data. Then, the processing returns.

Note that the document management method may be configured as a document management program by a computer program with which it can be executed in a computer. Further, this document management program may be stored on a computer readable recording medium.

Example 1

Figure 7:
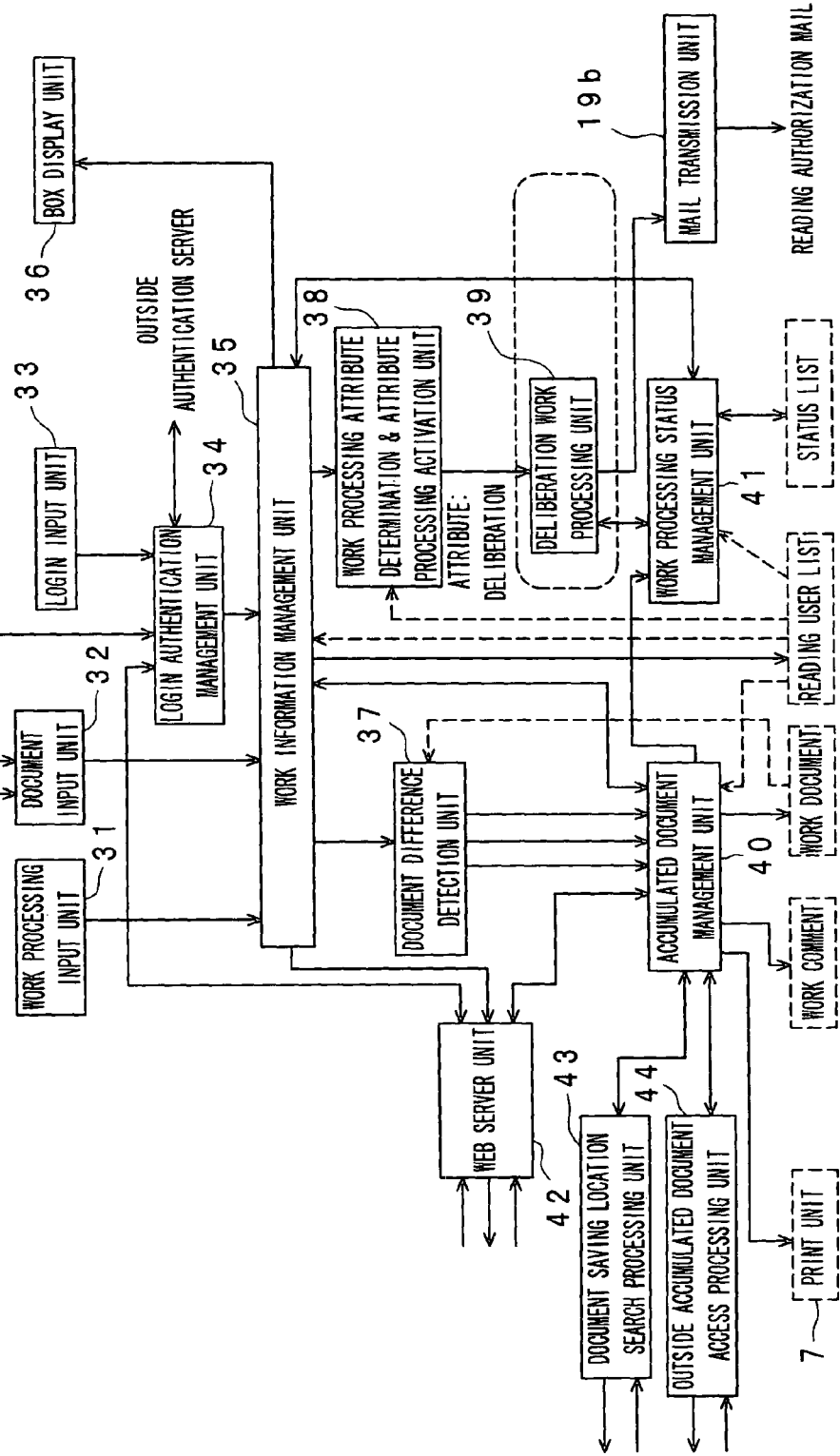
FIG. 7 is a block diagram showing the configuration relating to parameter processing of a controller of the document management device according to Example 1 of the present invention.

FIG. 7 is a block diagram showing the detailed configuration relating to processing of parameters of the controller 11 of a document management device according to Example 1 of the present invention. The controller 11 includes a work processing input unit 31, a document input unit 32, a login input unit 33, a login authentication management unit 34, work information management unit 35, a box display unit 36, a document difference detection unit 37, a work processing attribute determination & attribute processing activation unit 38, a deliberation work processing unit 39, an accumulated document management unit 40, a work processing status management unit 41, a web server unit 42, a document saving location search processing unit 43, and an outside accumulated document access processing unit 44. In FIG. 7, respective members are configured by dividing the functions by each processing of a parameter. On the other hand, in FIG. 2, respective constitutional members are configured by each function relating to processing of document data, not by each processing of a parameter. Therefore, each member in FIG. 7 and each constitutional member in FIG. 2 do not correspond one to one. The processing content of each member in FIG. 9 will be explained in each processing in a document management system including the document management device.

First, explanation will be given for a method of registering a deliberation document, which is a circular document, in a document management device by a manager of a document management system.

(1) A manager inputs a "deliberation mode" as a processing attribute from the work processing input unit 31 via the operating panel unit 17 of the document management device 10, and inputs a "deliberation party list" as a reading user list shown in Table 1 below, and inputs a "deliberation start instruction". Note that the reading user list is based on the relationship between the circular documents and additional information shown in FIG. 6 of the embodiment 2.

(2) The manager inputs a "deliberation start instruction". Further, in the case of a sheet document, it is converted into image data via the scanner unit 8 of the document management device 10, and in the case of the document being electronic data, it is inputted as document data via the PDL analyzing unit 18. In the document management device, the document inputted by the document input unit is received as a "deliberation document".

(3) When the work information management unit 35 of the document management device receives the "deliberation start instruction" from the work processing input unit 31, the work information management unit 35 issues a "work ID" having a unique value for each deliberation in order to manage a series of data such as "deliberation documents" so as to be associated with each other.

(4) At this time, the work information management unit 35 creates a "reading user list" based on information inputted, and stores in the inner memory.

(5) The work information management unit 35 notifies the work processing attribute determination & attribute processing activation unit 38 of the issued "work ID" and a "work processing activation request". Further, the work information management unit 35 transmits the "work ID" and the inputted "document data" to the document difference detecting unit 37.

TABLE 1

| <Reading User List> |
|---|
| >Work ID<br>>Work attribute<br>>Deliberation order<br>1. User ID<br>2. User ID<br>3. User ID<br>>Final processing |

(6) When the work processing attribute determination & attribute processing activation unit 38 receives the "work ID" and the "work processing activation request", it refers to the "reading user list" in Table 1, and activates any one of work processing unit according to the "work attribute" corresponding to the "work ID". In this case, the deliberation work processing unit 39 is activated.

(7) Then, the deliberation work processing unit 39, which has been activated, proceeds work processing by an event from the work processing status management unit 41.

(8) The document difference detection unit 37 inquires of the accumulated document management unit 40 whether the original document corresponding to the received "work ID" has already existed. Here, since the original document has not existed yet, a response of NO is returned. Therefore, the "work ID" and the "document data" are transmitted to the accumulated document management unit 40.

(9) The accumulated document management unit 40 accumulates the "document data" in a storing location of the work document associated with the "work ID" received, as a work document shown in Table 2 below. At this time, since the document associated with the received "work ID" is stored for the first time, the current generation No. of the work document is set to "0", and it is stored at a location of generation No.=0. The work document of the $0^{th}$ generation (generation No. 0) is set as the "original document".

(10) Upon receiving a request for registering the original document from the work information management unit 35, the accumulation document management unit 40 notifies the work processing status management unit 41 of the "work ID" and the "work start status".

TABLE 2

| <Work Document> |
|---|
| >work ID: 0<br>>generation No. 0<br>>document data |

(11) When the work processing status management unit 41 receives the "work start status", it creates a "status list" in Table 3 below from the "work ID" and the "reading user list".

(12) Next, the work processing status management unit 41 sets the status of the first user ID of the created "status list" as "now reading", and notifies the deliberation work processing unit 39, which is a work processing unit of the corresponding attribute, of a "status change notification".

(13) When the deliberation work processing unit 39 receives the "status change notification", it refers to the status list, and notifies the mail transmission unit to perform "reading authorization notification" to a user whose status has been changed.

(14) The mail transmission unit 19b transmits a "reading authorization mail" to the mail address of the user.

In this way, the manager can register the deliberation document in the document management device.

TABLE 3

<Status List>

>Work ID
>User ID
>Status
>Date
>User ID
>Status
>Date
>User ID
>Status
>Date

Next, explanation will be given for a method of outputting by printing a deliberation document as a sheet document in processing of a user who is a reader receiving a "reading authorization mail".

(1) First, the user who is a reader inputs a "user name" and a "password" in the web server unit 42 of the document management device 10 over a network, via a web browser of the PC which is a terminal.

(2) The web server unit 42 of the document management device 10 notifies the login authentication management unit 34 of the "user name" and the "password" inputted.

(3) The login authentication management unit 34 transmits the "user name" and the "password" to an outside authentication server, checks whether the user is an authorized user, and notifies the web server unit 42 of the "authentication result".

(4) If he/she is an authorized user, the "user ID" of the authorized user and "input unit: web input" are notified to the work information management unit 35.

(5) The work information management unit 35 notifies the accumulated document management unit 40 of a "document access request" and the "user ID". Then, the accumulated document management unit 40 refers to the reading user list so as to obtain the "work ID" from the "user ID", and returns the "document saving location" of the document data of the current generation No. within the work document associated with the "work ID".

(6) The work information management unit 35 notifies the web server unit 42 of the "document saving location" notified, according to the "input unit: web input".

(7) If the "authentication result" is access-authorized and the "document saving location" has been returned, the web server unit 42 transfers the screen to a document access request page.

(8) When the user designates a document in a box of the document saving destination displayed on the web browser and presses a document print key, a "document print request" is notified to the web server unit of the document management device 10.

(9) When the web server unit 42 receives the "document print request", it notifies the accumulated document management unit 40 of a "latest document print request".

(10) When the accumulated document management unit 40 receives the "latest document print request", it transmits "document data of the latest document" to the print unit 7, and also notifies the work processing status management unit 41 of the "user ID" and the "printed status".

(11) The print unit 7 prints the "document data" received on a sheet.

(12) When the work processing status management unit 41 receives the "printed status", it changes the status corresponding to the user ID of the status list, in which the user ID is registered, to "printed", and notifies the deliberation work processing unit 39, which is a work processing unit of the corresponding attribute, of the "status change notification".

(13) When the deliberation work processing unit 39 receives the "status change information", it refers to the status list, and since the status is "printed", notifies the work processing status management unit 41 to change the status of the user, whose status has been changed, to "wait for deliberation".

(14) The work processing status management unit 41 changes the status of the designated user ID to "wait for deliberation".

In this way, the user can print the deliberation document on a sheet.

Next, explanation will be given for a method in which a user adds additional information such as comments on a printed sheet document by hand, and the sheet document including the additional information is inputted as a deliberation result.

(1) A user inputs a "user name" and a "password" in the login input unit 33 via the operating panel unit 17 of the document management device 10.

(2) The login input unit 33 notifies the login authentication management unit 34 of the "user name" and the "password" inputted.

(3) The login authentication management unit 34 transmits the "user name" and the "password" to an outside authentication server, checks whether the user is an authorized user, and notifies the login input part 33 of the "authentication result". If the user is an authenticated user, the login authentication management unit 34 notifies the work information management unit 35 of the "user ID" of the authenticated user and "input unit: device input".

(4) The work information management unit 35 informs the accumulated document management unit 40 of a "document access request: status confirmation" and the "user ID". Then, the accumulated document management unit 40 refers to the reading user list, and requests the work processing status management unit for a "status confirmation request" by using the "user ID" as a parameter.

(5) When the work processing status management unit 41 receives the "status confirmation request", it refers to the reading user list so as to obtain the "work ID" corresponding to the "user ID", and returns the current status, as a reply, corresponding to the designated "user ID" from the status list corresponding to the "work ID" (in this case, "waiting for deliberation").

(6) Since the returned result is "waiting for deliberation", the accumulated document management unit 40 notifies the work information management unit 35 of the "deliberation document saving location" corresponding to the "work ID".

(7) The work information management unit 35 notifies the box display unit 36 of the "deliberation document saving location" notified, according to "input unit: device input".

(8) Since the "authentication result" is access-authorized, the login input unit 33 transfers the operating screen of the device to a box display screen.

(9) The user designates a box which is a deliberation saving destination displayed on the box display unit 36, and sets the deliberation document with comments written by hand at a scanning position, and presses the scan start key of the operating panel unit 17 of the document management device 10.

Then, the scan unit 8 reads out the deliberation document, and the "document with comments" is notified to the document input unit 32.

(10) The document input unit 32 delivers the "document data with comments" to the work information management unit 35.

(11) The work information management unit 35 refers to the reading user list so as to obtain the "work ID" from the corresponding "user ID" of the user performing a scanner input, and transmits the "work ID", the "user ID" and the "document with comments" to the document difference detecting unit 37.

(12) The document difference detecting unit 37 inquires of the accumulated document management unit 40 whether the original document (document of generation No.=0) corresponding to the received "work ID" has already existed. Here, since a reply that the document data of generation No.=0 has existed is returned, the document difference detecting unit 37 compares the "document data with comments" with a "document data" of the "current generation No." in the work document corresponding to the "work ID", and extracts the comment portion.

(13) The extracted "comment data" is transmitted to the accumulated document management unit 40 together with the "work ID" and the "user ID". Further, the "document data with comments" received is also transmitted to the accumulated document management unit 40 together.

(14) The accumulation document management unit 40 lists the "comment data" of each "user ID" associated with the "work ID" in the work comments shown in Table 4 below, and saves it on a predetermined saving location. At this time, the current generation No. is incremented by "1" to thereby update the work document and listed on the work document shown in Table 5 below so as to accumulate it at a predetermined storing location. Further, the "document data with comments" is also accumulated at a location of the updated current generation No. within the work document.

(15) When the accumulated document management unit 40 receives a request for accumulating a comment document from the work information management unit, the accumulated document management unit 40 notifies the work processing statue management unit of the "work ID" and the "work document accumulation status".

TABLE 4

<Work Comments>

>Work ID
>User ID
>Comment data
>User ID
>Comment data
>User ID
>Comment data

TABLE 5

<Work Document>

>Work ID
>Generation No. 0
>Document data
>Generation No. 1
>Document data with comments
>Generation No. 1
>Document data with comments
>Generation No. 1
>document data with comments

(16) When the work processing status management unit 41 receives the "work document accumulation status", it sets the status of the "user ID" of the "status list" associated with the "work ID" to "document registration", and notifies the deliberation work processing unit 39, which is a work processing unit of the corresponding attribute, of a "status change notification".

(17) When the deliberation work processing unit 39 receives the "status change notification", it refers to the status list. Since the status is "document registration", the deliberation work processing unit 39 notifies the work processing status management unit 41 to change the status of the user whose status has been changed to "deliberation end", and to change the status of the next user ID in the reading order to "under deliberation".

(18) The work processing status management unit 41 changes the status of the designated user ID to the notified status. If there is no next user in the reading order, the work processing status management unit 41 notifies the deliberation work processing unit of "circulation end".

(19) The deliberation work processing unit 39 notifies the mail transmission unit 45 to send "reading authorization notification" to the user of the "under reading" status.

(20) Upon receiving the deliberation end notification from the work processing status management unit 41, the deliberation work processing unit 39 refers to the reading user list, and performs processing according to the final processing. For example, if the final processing is a "notification to a person requesting deliberation", the deliberation work processing unit 39 instructs the mail transmission unit 45 to send a deliberation end mail to the person requesting the deliberation (manager).

In this way, when a user adds additional information such as comments by hand on a sheet document, the sheet document including the additional information can be inputted as a deliberation result.

Conventionally, when all comments are to be extracted at the end of circulation, comments of respective readers may be overlapped, so misrecognition may be caused. Further, in order to extract comments of each reader surely, the manager should transmits the deliberation document to a reader separately and to receive the document returned from the reader after comments have been written, so there has been a problem that management and handle become troublesome. In contrast, according to the document management system according to Example 1, additional information added by each reader is recognized based on the difference obtained by comparing the document with the document of last generation before addition. Therefore, additional information can be recognized accurately without any influence of noise.

Example 2

A document management system according to Example 2 of the present invention is different in that a user (reader) performs deliberation with an electronic document and adds comments as electronic data, comparing with the document management system of Example 1.

First, explanation will be given for a procedure to obtain a deliberation document in processing by a user receiving a "reading authorization mail".

(1) A user inputs a "user name" and a "password" in the web server unit 42 of the document management device 10 over the network 20 via a web browser of a terminal.

(2) The web server unit 42 notifies the login authentication management unit of the "user name" and the "password" inputted.

(3) The login authentication management unit 34 transmits the "user name" and the "password" to an outside authentication server, and checks whether the user is an authorized user, and notifies the web server unit of the "authentication result". If the user is an authorized user, the "user ID" of the authorized user and "input-unit: web input" are notified to the work information management unit 35.

(4) The work information management unit 35 notifies the accumulated document management unit 40 of a "document access request" and the "user ID". Then, the accumulated document management unit 40 refers to the reading user list so as to obtain the "work ID" from the "user ID", and returns a "document saving location" of the document data of the current generation No. within the work document associated with the "work ID".

(5) The work information management unit 35 notifies the web server unit 42 of the notified "document saving location" in accordance with "input unit: web input".

(6) If the "authentication result" is access-authorized and a reply of "document saving location" is returned, the web server unit 42 transfers the screen to a document access request page.

(7) When the user designates a document in the box of the document saving destination displayed on the web browser on the terminal and presses the document obtaining key, a "document obtainment request" is notified to the web server unit 42.

(8) When the web server unit 42 receives the "document obtainment request", it notifies the accumulated document management unit 40 of a "latest document obtainment request".

(9) When the accumulation document management unit 40 receives the "latest document obtainment request", it transmits "document data of the latest document" to the web server unit 42 and notifies the work processing status management unit 41 of the "user ID" and the "transmitted status". The "document data of the latest document" is transmitted from the web server unit 42 via the network controller 9. The user receives the "document data of the latest document" at the terminal.

(10) When the work processing status management unit 41 receives the "transmitted status", it changes the status corresponding to the user ID of the status list in which the user ID is registered to "transmitted", and notifies the deliberation work processing unit 39, which is a work processing unit of the corresponding attribute, of a "status change notification".

(11) When the deliberation work processing unit 39 receives the "status change notification", it refers to the status list. Since the status is "transmitted", the deliberation work processing unit 39 notifies the work processing status management unit 41 to change the status of the user, whose status has been changed, to "waiting for deliberation".

(12) The work processing status management unit 41 changes the status of the designated user ID to "wait for deliberation".

In this way, the user can receive the deliberation document at a terminal.

Next, explanation will be given below for a method in which additional information which is electronic data is added to a deliberation document which is electronic data, and document data including the additional information is inputted as a deliberation result.

(1) The E-mail receiving unit 19*a* notifies the login authentication management unit 34 of a "user name" and a "password" attached to a received mail.

(2) The login authentication management unit 34 transmits the "user name" and the "password" to an outside authentication server, and confirms whether the user is an authorized user, and notifies the E-mail receiving unit 19*a* of the "authentication result". If the user is an authorized user, the login authentication management unit 34 notifies the work information management unit 35 of the "user ID" of the authorized user and "input unit: E-mail input".

(3) The information management unit 35 notifies the accumulated document management unit 40 of "document access request: status confirmation" and the "user ID". Then, the accumulated document management unit 40 refers to the reading user list, and notifies the work processing status management unit 41 of a "status confirmation request" by using the "user ID" as a parameter.

(4) When the work processing status management unit 41 receives the "status confirmation request", it refers to the reading user list so as to obtain a "work ID" corresponding to the "user ID", and returns the current status (in this case, "wait for deliberation") corresponding to the designated "user ID" from the status list corresponding to the "work ID", as a reply.

(5) Since the returned result is "wait for deliberation", the accumulated document management unit 40 notifies the work information management unit 35 of a "deliberation document saving location" corresponding to the "work ID".

(6) The work information management unit 35 notifies the E-mail receiving unit 19*a* of the notified "deliberation document saving location" in accordance with "input unit: E-mail input".

(7) Since the "authentication result" is access-authorized, the E-mail receiving unit 19*a* designates a "deliberation document saving location", and notifies the document input unit 32 of a "document with comments" attached to the mail.

(8) The document input unit 32 delivers the "document data with comments" to the work information management unit 35.

(9) The work information management unit 35 refers to the reading user list so as to obtain a "work ID" from the "user ID" of the user receiving the E-mail, and transmits the "work ID", the "user ID", and the document data with comments" to the document difference detection unit 37.

The subsequent processing is omitted, since it is same as the processing after step (11) of inputting a deliberation document result document in the case of performing deliberation with a sheet document in the processing by the user receiving the "reading authorization mail".

Further, the document difference detection unit 37 separates comments on an electronic document or handwritten comments, corresponding to the document with comments notified.

Example 3

Figure 8A:
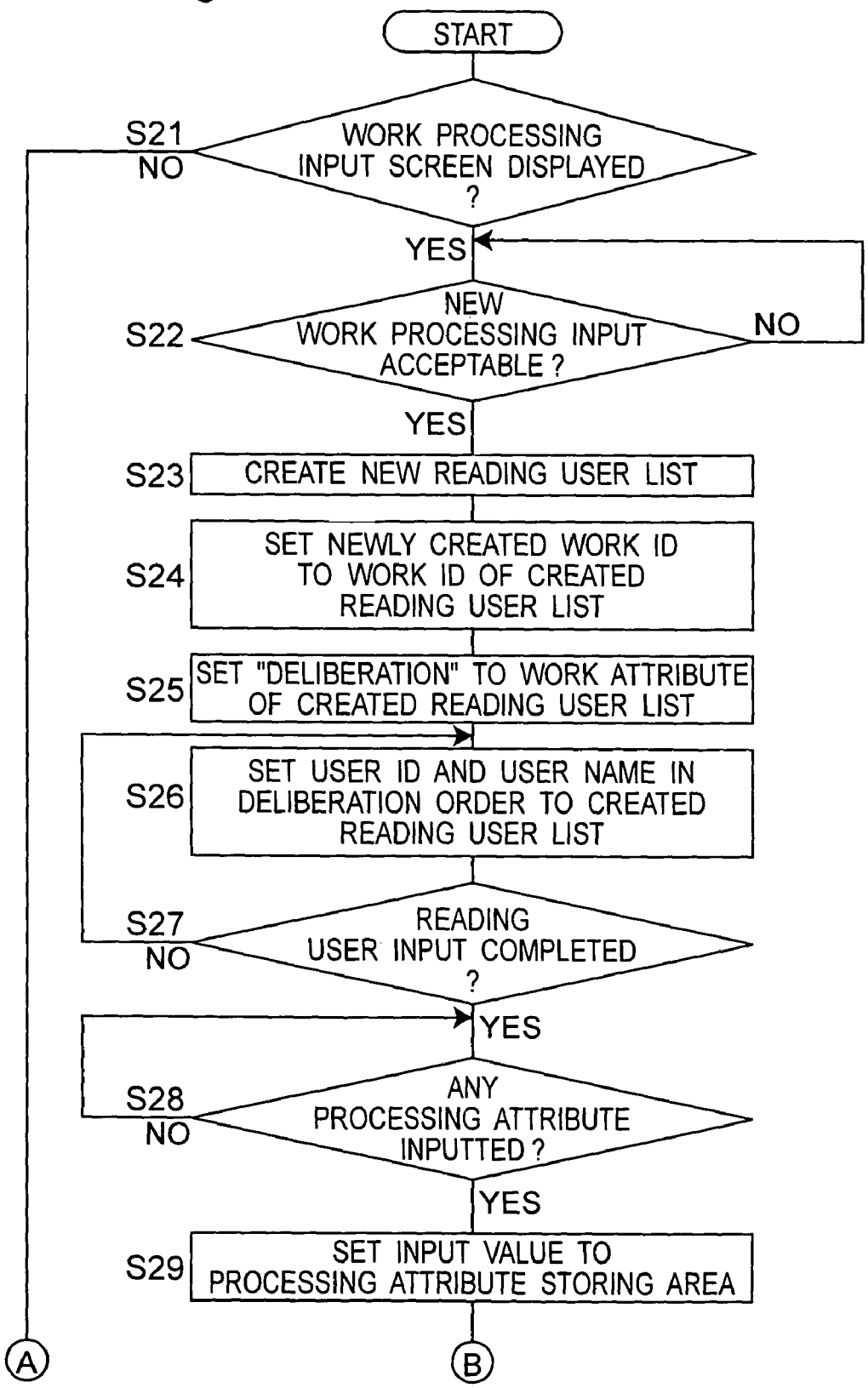
FIGS. 8A and 8B are flowchart showing a method of creating a reading user list according to Example 3 of the present invention.
Figure 8B:
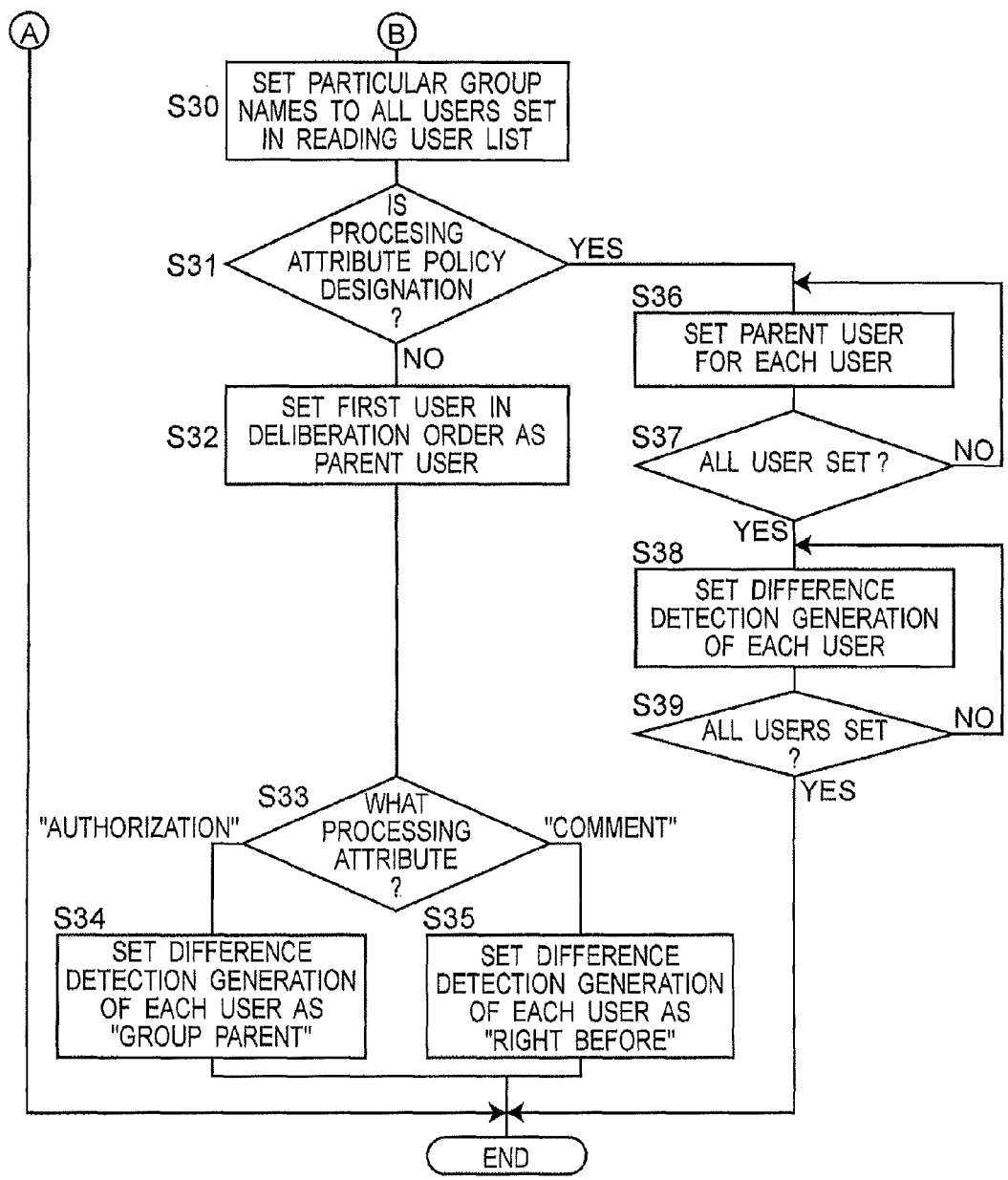

A document management method according to Example 3 of the present invention has characteristics in setting a processing attribute in a method of creating a reading user list, comparing with document management methods according to Examples 1 and 2. FIGS. 8A and 8B is flowchart showing a method of creating a reading user list in the document management method according to Example 3.

(a) First, it is determined whether a work processing input screen is on display (S21). If the display is not a work processing input screen, the processing ends.

(b) It is determined whether a new work processing input key is acceptable (S22). If an input key is not acceptable, an acceptance of an input key is waited again. If an input key is acceptable, the processing moves to the next step S23.

(c) A new reading user list is created (S23).

(d) A newly created work ID is set to the work ID of the created reading user list (S24). A work ID is set for each reading user list.

(e) "Deliberation" is set to the work attribute of the created reading user list (S25). Note that "deliberation" is a work attribute which unit the document is subject to addition of comments or authorization.

(f) User IDs and user names are set in the deliberation order in the created reading user list (S26). Thereby, a reading user list as shown in Table 1 is created, for example.

(g) It is determined whether reading user input is completed (S27). When input of all reading users has been completed, the processing moves to the next step S28. On the other hand, if there is a reading user not been inputted, the processing is back to step S26.

(h) It is determined whether a processing attribute is inputted (S28). If it has not been inputted, an input of a processing attribute is waited. If it has been inputted, the processing moves to the next step S29.

(i) An input value is set in a processing attribute storing area (S29).

(j) A particular group name is set to all users set in the reading user list (S30). Here, one reading user list is handled as one group so as to manage all pieces of additional information by associating them with the $0^{th}$ generation document data.

(k) It is determined whether the processing attribute is "policy designation" (S31). If it is policy designation, the processing moves to step S36. On the other hand, if it is not policy designation, the processing moves to step S32.

(l) A user who is the first in the deliberation order is set as a parent user (S32).

(m) It is determined whether the processing attribute is "authorization" or "comment" (S33). If it is "authorization", the processing moves to step S34, and if it is "comment", moves to step S35.

(n) If the processing attribute is "authorization", a difference detection generation of each user is set as a "group parent" (S34). Note that "difference detection generation" means a document which is the object of difference detection when extracting additional information.

(o) If the processing attribute is "comment", the difference detection generation of each user is set as "right before" (S35). Then, creation of the reading user list ends.

(p) If the processing attribute is "policy designation", a parent user is set to each user of the group (S36). Then, creation of the reading user list ends.

(q) It is determined whether setting has been completed for all users (S37). If there is a user who has not been set, the processing is back to step S36.

(r) A difference detection generation is set for each user (S38).

(s) It is determined whether setting has been completed for all users (S39). If there is a user who has not been set, the processing is back to step S38. If setting has been completed for all users, creation of the reading user list ends.

In this way, the "reading user list" can be created.

The document management device according to the present invention can be used as a device for managing documents circulated to readers in sequence via network and additional information added to the documents by the readers.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A document management device, connected to a plurality of reader terminals via a network, for managing a document circulated to a reader in accordance with a circulation tree and additional information added to the document by the reader, the circulation tree indicating a circulation order of a plurality of readers, the device comprising:

a document circulation unit operable to send $0^{th}$ generation document data or note a storing location of the $0^{th}$ generation document data to a selected reader terminal, and to receive $1^{st}$ generation document data in which $1^{st}$ piece of additional information from a first reader associated with the selected reader terminal is added to the $0^{th}$ generation document data, according to circulation order of the circulation tree after the first reader, to send $(n-1)^{th}$ generation document data which cumulatively includes $1^{st}$ to $(n-1)^{th}$ pieces of additional information added to $n^{th}$ reader terminal, or note a storing location of the $(n-1)^{th}$ generation document data to the $n^{th}$ reader terminal, and to receive $n^{th}$ generation document data in which $n^{th}$ piece of additional information from $n^{th}$ reader associated with the $n^{th}$ reader terminal is added to the $(n-1)^{th}$ generation document data, wherein n is an integer not less than 2;

a circulation information management unit operable to set the circulation tree indicating the circulation order of the plurality of readers, and to set a processing attribute with respect to each reader which is used to select one of a plurality of documents as a difference detection generation document, the difference detection generation document being an object of difference detection when extracting additional information;

a recognition unit operable to recognize $n^{th}$ additional information which is extracted based on the difference between the $n^{th}$ generation document data and the difference detection generation document set based on the processing attribute; and an additional information management unit operable to store the $n^{th}$ additional information recognized in association with the $0^{th}$ generation document data, and to manage the $0^{th}$ generating document data in association with each additional information;

wherein the circulation information management unit sets either authorization or comment as the processing attribute, when the processing attribute is authorization, the $0^{th}$ generation document data is set as the difference detection generation document, when the processing attribute is comment, the $(n-1)^{th}$ generation document is set as the difference detection generation document for the $n^{th}$ generation document.

2. A non-transitory computer readable medium encoded with computer executable instructions for managing a document circulated to a reader according to a circulation tree and additional information added to the document by the reader, the circulation tree indicating a circulation order of plurality of readers, the computer executable instructions comprising: sending $0^{th}$ generation document data to a first reader terminal or noticing a storing location of the $0^{th}$ generation document data in which $1^{st}$ piece of additional information from a first reader associated with the first reader terminal is added to the $0^{th}$ generation document data, according to circulation order of the circulation tree after the first reader, sending $(n-1)^{th}$ generation document data which cumulatively includes $1^{st}$ to $(n-1)^{th}$ pieces of additional information added to $n^{th}$ reader terminal, or noticing a storing location of the $(n-1)^{th}$ generation document data to the $n^{th}$ reader terminal, and receiving $n^{th}$ generation document data in which $n^{th}$ piece of additional information from $n^{th}$ reader associated with the $n^{th}$ reader terminal is added to the $(n-1)^{th}$ generation document data, wherein n is an integer not less than 2;

setting the circulation tree indicating the circulation order of the plurality of readers, and setting a processing attribute with respect to each reader which is used to select one of a plurality of documents as a difference detection generation document, the difference detection generation document being an object of difference detection when extracting additional information;

recognizing $n^{th}$ additional information which is extracted based on the difference between the $n^{th}$ generation document data and the difference detection generation document set based on the processing attribute; and storing the $n^{th}$ additional information recognized in association with the $0^{th}$ generation document data, and managing the $0^{th}$ generation document data in association with each additional information;

wherein in the course of the step of setting the processing attribute either authorization or comment is set as the processing attribute when the processing attribute is authorization, the $0^{th}$ generation document data is set as the difference detection generation document, when the processing attribute is comment, the $(n-1)^{th}$ generation document is set as the difference detection generation document for the $n^{th}$ generation document.

3. A method for managing a document circulated to a reader, via a network of a plurality of reader terminals, according to a circulation tree and additional information added to the document by the reader, the circulation tree indicating a circulation order of plurality of readers, the method comprising:

sending $0^{th}$ generation document data or a storing location of the $0^{th}$ generation document data to a first reader terminal;

receiving $1^{st}$ generation document data in which $1^{st}$ piece of additional information from a first reader associated with the reader terminal is added to the $0^{th}$ generation document data;

according to circulation order of the circulation tree after the first reader, sending $(n-1)^{th}$ generation document data which cumulatively includes $1^{st}$ to $(n-1)^{th}$ pieces of additional information added, or a storing location of the $(n-1)^{th}$ generation document data to $n^{th}$ reader terminal;

receiving $n^{th}$ generation document data in which $n^{th}$ piece of additional information from $n^{th}$ reader associated with the $n^{th}$ reader terminal is added to the $(n-1)^{th}$ generation document data, wherein n is an integer not less than 2;

setting the circulation tree indicating the circulation order of the plurality of readers;

setting a processing attribute with respect to each reader which is used to select one of a plurality of documents as a difference detection generation document, the difference detection generation document being an object of difference detection when extracting additional information;

recognizing $n^{th}$ additional information which is extracted based on the difference between the $n^{th}$ generation document data and the difference detection generation document set based on the processing attribute; and storing the $n^{th}$ additional information recognized in association with the $0^{th}$ generation document data, and to manage the $0^{th}$ generation document data in association with each additional information;

wherein in the course of the step of setting the processing attribute, either authorization or comment is set as the processing attribute, when the processing attribute is authorization, the $0^{th}$ generation document data is set as the difference detection generation document, when processing attribute is comment, the $(n-1)^{th}$ generation document is set as the difference detection generation document for the $n^{th}$ generation document.

\* \* \* \* \*